(12) United States Patent
Hamilton et al.

(10) Patent No.: US 7,281,219 B2
(45) Date of Patent: Oct. 9, 2007

(54) BLENDED LEARNING EXPERIENCE TOOL AND METHOD

(75) Inventors: Charles A. Hamilton, Vancouver (CA); Janis A. Morariu, Hardy, VA (US); Tony M. O'Driscoll, Cary, NC (US); James J. Sharpe, Norton, IL (US); Mark F. Sidlauskas, Closter, NJ (US); Inderpreet S. Thukral, Delmar, NY (US)

(73) Assignee: International Business Machines Corporation, Armonk, NY (US)

( * ) Notice: Subject to any disclaimer, the term of this patent is extended or adjusted under 35 U.S.C. 154(b) by 853 days.

(21) Appl. No.: 10/729,747

(22) Filed: Dec. 5, 2003

(65) Prior Publication Data

US 2005/0123894 A1    Jun. 9, 2005

(51) Int. Cl.
*G06F 3/048* (2006.01)

(52) U.S. Cl. ............... 715/834; 715/810; 715/811; 715/814; 434/262; 434/322; 434/350; 434/365

(58) Field of Classification Search ........... 715/834, 715/810, 811; 434/262, 322, 350, 365; 706/12, 706/16
See application file for complete search history.

(56) References Cited

U.S. PATENT DOCUMENTS

| | | | |
|---|---|---|---|
| 6,341,960 B1 | 1/2002 | Frasson et al. | 434/322 |
| 6,549,219 B2* | 4/2003 | Selker | 715/834 |
| 6,604,094 B1 | 8/2003 | Harris | 706/48 |
| 6,839,072 B2* | 1/2005 | Trajkovic et al. | 715/811 |
| 2002/0076674 A1 | 6/2002 | Kaplan | 434/107 |
| 2002/0077884 A1 | 6/2002 | Sketch | 705/12 |
| 2002/0087346 A1 | 7/2002 | Harkey | 705/1 |
| 2002/0132213 A1 | 9/2002 | Grant et al. | 434/322 |
| 2002/0169822 A1 | 11/2002 | Packard et al. | 709/203 |
| 2004/0250260 A1* | 12/2004 | Pioso | 719/316 |
| 2006/0036629 A1* | 2/2006 | Gray | 707/100 |

FOREIGN PATENT DOCUMENTS

| | | |
|---|---|---|
| FR | 2803928 A1 | 7/2001 |
| JP | 2000066572 A | 3/2000 |
| JP | 2001350854 A | 12/2001 |
| JP | 2003084653 A | 3/2003 |
| KR | 2001077749 | 2/2000 |
| KR | 2002074241 | 3/2001 |
| KR | 2001103810 | 7/2001 |

(Continued)

OTHER PUBLICATIONS

"Evaluating the Design and Delivery of WWW Based Educational Environments and Coursewares", V. Wade & C. Power, 6th Annual Conference on the Teaching of Computing, Dublin, Ireland, Aug. 17-21, 1998, pp. 243-248.

(Continued)

*Primary Examiner*—Ba Huynh
*Assistant Examiner*—Thuy Osberg
(74) *Attorney, Agent, or Firm*—John R. Pivnichny

(57) ABSTRACT

A blended learning solution is defined by determining degrees of elements in learning zones. The zones are defined by the types of interactions of the learners. Both formal and informal learning is defined for each zone. A specialized circular display is constructed to depict the optimal blended learning solution.

19 Claims, 3 Drawing Sheets

FOREIGN PATENT DOCUMENTS

KR        2001000529        10/2001

OTHER PUBLICATIONS

Shin et al., "A Web-Based, Interactive Virtual Laborary System for Unit Operations and Process Systems Engineering Education: Issues, Design and Implementation", Computers and Chemical Engineering, vol. 26, Issue 2, Feb. 15, 2002, pp. 319-330.

Morcos et al., "Assessing Student Learning in a Distance Education Environment", Frontiers in Education Conference, Oct. 18-21, 2000, Kansas City, Missouri, vol. 2, p. S3D-5.

Klein et al., "A Process Model for Developing Virtual Education Contents", Wirtschaftsinformatik, Germany, vol. 43, Issue 1, Feb. 2001, pp. 35-45.

Melody Ann Williams, "Integrating Concept Mapping Into Science Curriculum and Instructional Practice: Teacher Experiences, Observations, and Recommendations for Future Projects", Journal of Interactive Learning Research, 1997, pp. 457-485.

Tortora et al., "A Multilevel Learning Management System", SEKE '02, Jul. 15-19, 2002, Ischia, Italy, pp. 541-547.

Michael F. McTear, "Spoken Dialogue Technology: Enabling the Conversational User Interface", ACM Computing Surveys, vol. 34, No. 1, Mar. 2002, pp. 90-169.

Saddik et al., "Reusabiity and Adaptability of Interactive Resources in Web Based Educational Systems", ACM Journal of Educational Resources in Computing, vol. 1, No. 1, Spring 2001, Article #2, pp. 1-19.

Saddik et al., "Metadata for Smart Multimedia Learning Objects", ACE 2000, Dec. 2000, Melbourne, Australia, pp. 87-94.

* cited by examiner

BLENDED LEARNING EXPERIENCE TOOL AND METHOD

RELATED APPLICATION

This application is related to application Ser. No. 10/729,761 entitled "OPERATIONALIZING A LEARNING SOLUTION" which is co-owned by the same assignee and filed on the same date.

TECHNICAL FIELD

The invention relates generally to the field of training or learning systems. More particularly the invention relates to learning systems which integrate traditional classroom learning with new modes of learning such as on-line and web-based learning as well as integration of formal and informal learning experiences.

BACKGROUND OF THE INVENTION

Organizations are deploying new learning technologies to supplement conventional classroom or instructor led training (ILT). Technology enabled delivery modes including on-line learning and web-based learning allow learners to interact without being physically present in a classroom. These organizations, however, are struggling with the problem of integrating these new modes of learning to achieve their desired objectives while minimizing overall training costs. It is often the case that the desired learning outcome as measured by a return on investment spending on training is not optimized because training programs are designed around a classroom experience and do not take advantage of other technology based learning due to this lack of effective integration of these two modes.

Examples of technology based learning include U.S. Pat. No. 6,341,960 by Frasson et al. Networked cognitive agents are employed to provide intelligent assistance in a distance learning situation.

Harris, in U.S. Pat. No 6,604,094 describes an interactive learning method using a learning model along with speech recognition and synthesis techniques.

Wade and Power in their article titled "Evaluating the Design and Delivery of WWW Based Educational Environments and Courseware" presented at the 6$^{th}$ Annual Conference on the Teaching of Computing, Dublin, Ireland held Aug. 17-21, 1998 describe the application of world wide web (WWW) based technology to support distance education and computer aided learning. Interestingly, Wade and Power note that such courses frequently are not properly integrated within an educationally sound curriculum and fail to enhance learning skills.

It is therefore evident that improved methods of providing such integration is a desirable objective and would constitute a significant advancement in the art.

OBJECTS AND SUMMARY OF THE INVENTION

A principal object of the present invention is to enhance the learning solution art by providing a method of representing a learning solution with enhanced capabilities.

It is another object to provide such a method wherein enhanced capabilities are possible.

It is a further object to provide a computer program product having such a capability.

These and other objects are attained in accordance with one embodiment of the invention wherein there is provided a method of displaying a blended learning experience, comprising the steps of defining degrees of elements in learning zones, defining a percentage of formal learning for each zone, constructing a circular display having wedges corresponding to the zones with each wedge having an inner sub-wedge, wherein the angular width of each wedge corresponds to the degrees and the radius of each sub-wedge corresponds to the percentage of formal learning, and displaying the circular display on a computer monitor or hardcopy printout.

In accordance with another embodiment of the invention there is provided a method of providing a representation of a learning solution, comprising the steps of determining degrees of elements in learning zones, determining a percentage of formal learning for each zone, constructing a circular display having wedges corresponding to the zones with each wedge having an inner sub-wedge, wherein the angular width of each wedge corresponds to the degrees and the radius of each sub-wedge corresponds to the percentage of formal learning, and displaying the circular display on a computer monitor or hardcopy printout.

In accordance with yet another embodiment of the invention there is provided a computer program product for instructing a processor to represent a learning solution, the computer program product comprising a computer readable medium, first program instruction means for defining degrees of elements in learning zones, second program instruction means for defining a percentage of formal learning for each zone, third program instruction means for constructing a circular display having wedges corresponding to the zones with each wedge having an inner sub-wedge, wherein the angular width of each wedge corresponds to the degrees and the radius of each sub-wedge corresponds to the percentage of formal learning, and fourth program instruction means for displaying the circular display on a computer monitor or hardcopy printout, and wherein all the program instruction means are recorded on the medium.

BEST MODE FOR CARRYING OUT THE INVENTION

For a better understanding of the present invention together with other and further objects, advantages, and capabilities thereof, reference is made to the following disclosure and the appended claims in connection with the above-described drawings.

The learning solutions market requires a comprehensive model to address emerging learning methods such as informal learning. Informal learning shall be taken herein to mean learning in which the learner decides when and how sources are used. Alternatively informal learning may be taken herein to mean unstructured learning. Structured learning is a predefined, predetermined learning experience defined by an organization rather than the individual learner. Such informal learning comprises up to 80% of the learning experience for corporate knowledge workers.

The learning optimization model (LOM) of the present invention incorporates informal learning into a solution design and recognizes the impact of formal and informal learning. The LOM also recognizes how content is defined by the learner context which includes the learner, his/her educational role, competency level and physical environment. Various types of learner interactions are defined by the LOM and provide a linkage to learning objectives. Learning delivery modes are also optimized to the context of the learner, whether the learner is located in a classroom or participating on a virtual team.

Figure 1:
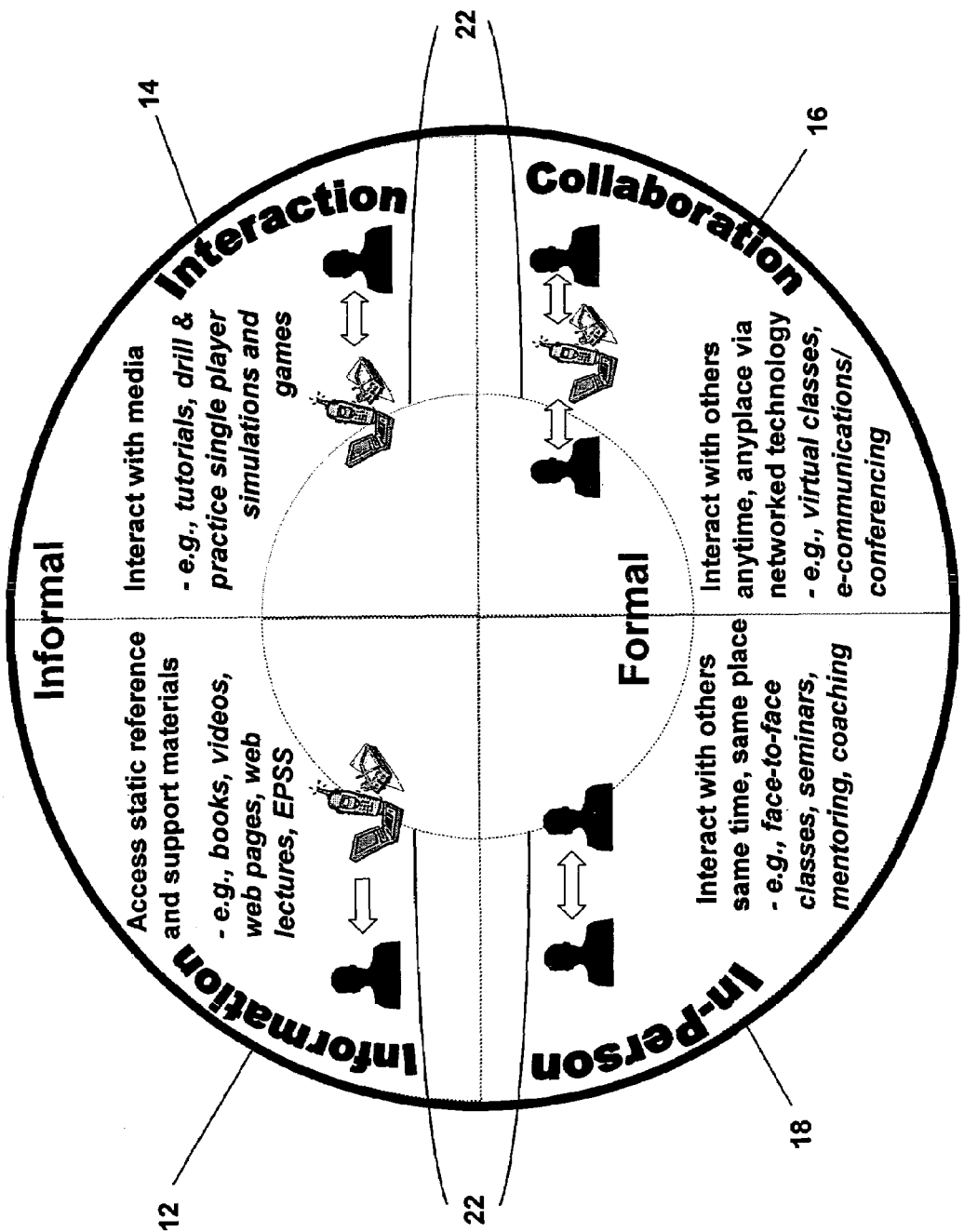
FIG. 1 is a circular display of a blended learning experience.

In FIG. 1 there is shown a circular display of a blended learning experience in accordance with the LOM of the present invention. Four radial zones refer to a specific type of learning experience. Within each zone are specific learning elements which may be selected for a particular learning solution.

Information zone 12 deals with self-directed knowledge acquisition. Information flows one way from the media source to the learner. Elements of this zone include static sources of information such as books, journals, reference material, web pages, videos, or the wearable electronic performance support system (EPSS) used for real time training of plant personnel.

Interaction zone 14 deals with an individual engaging with programs designed for tutorial instruction, drill and practice, simulation, and gaming. In this zone the learner interacts only with automated programs or processes, not with other students or an instructor.

Information and interaction zones 12, 14 describe learning experiences focused on the individual learner. The remaining zones to be described below refer to collaborative or group based learning.

Collaboration zone 16 deals with learners brought together online with other learners, instructors, or mentors through technologies. Learners use collaborative techniques such as chat, team rooms, virtual classes, e-meetings, or the like to enable people-to-people exchanges and interactions. The exchanges and interactions may be online at the same time as well as off-line (asynchronously).

In-Person zone 18 deals with people interacting with each other in the same classroom. Examples include the traditional classroom model, mentoring, coaching, or team members engaged together.

For any learning solution the amount of informal and formal learning will differ in each zone. Boundary arcs 22 separate an inner ring representing the amount of formal learning and an outer ring representing the amount of informal learning for each zone or vice versa. For example, boundary arc 22 may be positioned so that the area of the inner circle wedge for a particular zone represents a percentage of total zone area for that zone. The percentage may represent the percentage of total learning hours within that zone devoted to formal learning. Other schemes for placement of radial boundary lines may be used such as radial distance from the center as a percentage of formal learning.

In like manner, the angular width of each zone wedge in degrees can vary to correspond to degrees of elements selected in each zone. Degrees of elements shall be taken to mean the form and how much of each element is selected. For example, suppose a particular learning experience, say new employee orientation, is expected to take 20 hours, and 5 hours of training time will be taken in learning time by the degrees of elements selected from information zone 12. Then the angular width of information zone 12 would be 5/20 of a full circle (360 degrees) or 90 angular degrees. Other learning units besides hours may be used in the above calculations without departing from the scope of the present invention.

Figure 2:
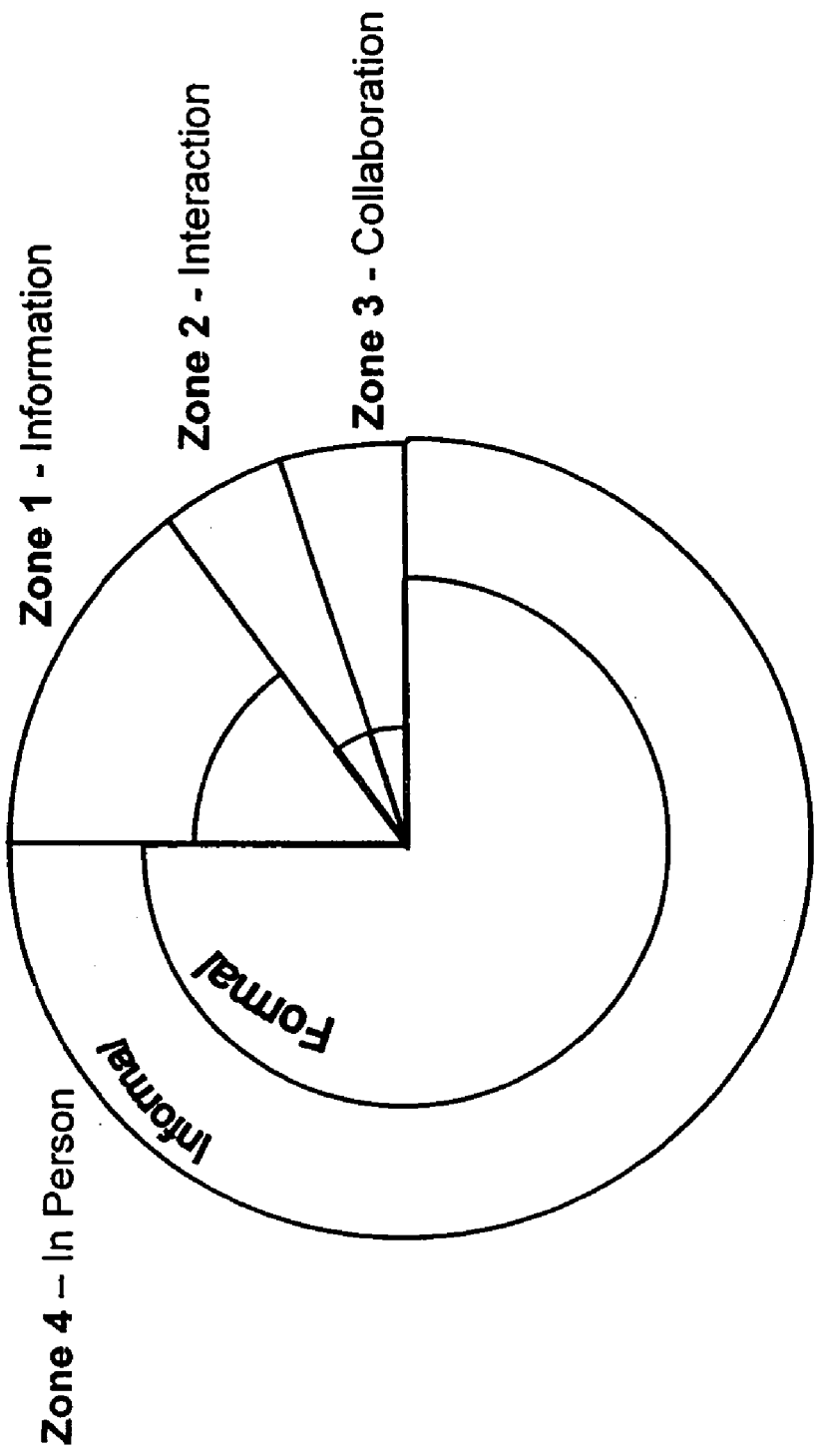
FIGS. 2 & 3 are examples of specific blended learning solutions.
Figure 3:
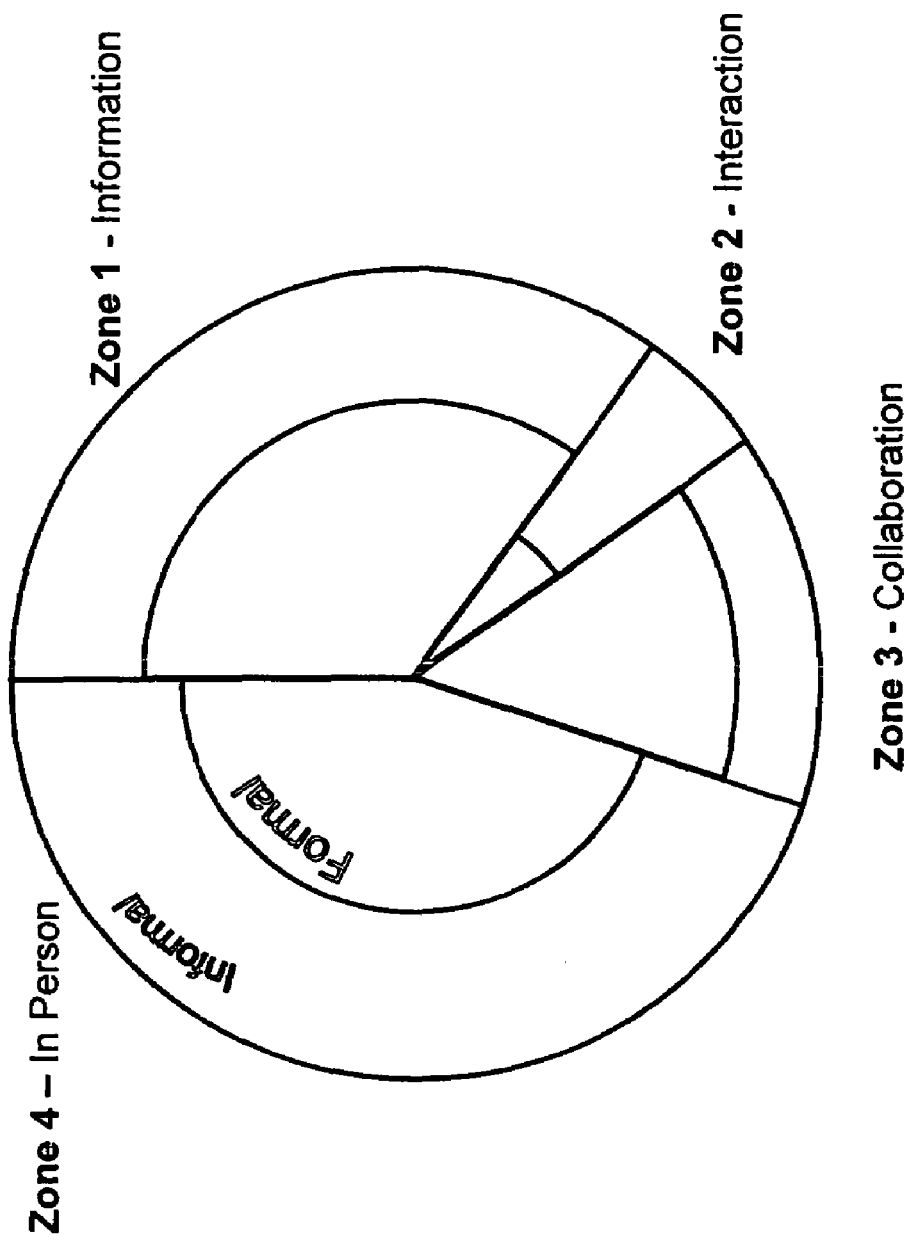

A single learning solution will be a combining or blending of the zones. One can choose varying degrees of elements from each zone, or choose only from selected zones. The amount of formal and informal learning will also change from zone to zone based on defined learning objectives or the intent of the learner. FIGS. 2 and 3 show two examples of specific learning solutions. A specific learning solution may represent the optimal blended learning mix for a corporate management development course, a high school biology curriculum, or an online home improvement course offered by a hardware store chain.

Once the optimum blended learning degrees and percentages are determined for any solution, the display of FIGS. 1, 2, or 3 may be constructed. A computer program product may be used to assist in performing the blended solution determination. The computer program product may also include instructions for automatically drawing or displaying or printing the circular representation as shown in FIGS. 1, 2 or 3.

While there have been shown and described what are at present considered the preferred embodiments of the invention, it will be obvious to those skilled in the art that various changes and modification may be made therein without departing from the scope of the invention as defined by the appended claims.

What is claimed is:

1. A method of displaying a blended learning experience, comprising the steps of:
    defining degrees of elements in learning zones;
    defining a percentage of formal learning for each said zone;
    constructing a circular display having wedges corresponding to said zones with each said wedge having an inner sub-wedge, wherein the angular width of each wedge corresponds to said degrees and the radius of each said sub-wedge corresponds to said percentage of formal learning; and
    displaying said circular display on a computer monitor or hardcopy printout.

2. The method of claim 1, wherein said zones are information, interaction, collaboration, and in-person.

3. The method of claim 2, wherein said information zone comprises access to static reference and support materials including books, videos, web pages, web lectures, or EPSS.

4. The method of claim 2, wherein said interaction zone comprises interaction with media including tutorials, drill and practice simulations, or games.

5. The method of claim 2, wherein said collaboration zone comprises interaction with others via networked technology including virtual classes, e-communications, or e-conferencing.

6. The method of claim 2, wherein said in-person zone comprises simultaneous interaction with others at a single place including face-to-face classes, seminars, mentoring, or coaching.

7. The method of claim 1, wherein said formal learning is prescribed with intended goals and objectives set by an organization.

8. The method of claim 1, wherein informal learning is learning in which the learner decides when and how sources are used.

9. The method of claim 1, wherein said percentage is measured as a percentage of total learning hours devoted to said formal learning.

10. A method of providing a representation of a learning solution, comprising the steps of:
    determining degrees of elements in learning zones;

determining a percentage of formal learning for each said zone;

constructing a circular display having wedges corresponding to said zones with each said wedge having an inner sub-wedge, wherein the angular width of each wedge corresponds to said degrees and the radius of each sub-wedge corresponds to said percentage of formal learning; and displaying said circular display on a computer monitor or hardcopy printout.

11. The method of claim 10, wherein said degrees are angular degrees of a full circle.

12. The method of claim 10, wherein said zones are information, interaction, collaboration, and in-person.

13. The method of claim 10, wherein said formal learning is prescribed with intended goals and objectives set by an organization.

14. The method of claim 10, wherein informal learning is learning in which the learner decides when and how sources are used.

15. A computer program product for instructing a processor to represent a learning solution, said computer program product comprising:

a computer readable medium;

first program instruction means for defining degrees of elements in learning zones;

second program instruction means for defining a percentage of formal learning for each said zone;

third program instruction means for constructing a circular display having wedges corresponding to said zones with each said wedge having an inner sub-wedge, wherein the angular width of each wedge corresponds to said degrees and the radius of each said sub-wedge corresponds to said percentage of formal learning; and fourth program instruction means for displaying said circular display on a computer monitor or hardcopy printout; and wherein all said program instruction means are recorded on said medium.

16. The computer program product of claim 15, wherein said degrees are angular degrees of a full circle.

17. The computer program product of claim 15, wherein said zones are information, interaction, collaboration, and in-person.

18. The computer program product of claim 15, wherein said formal learning is prescribed with intended goals and objectives set by an organization.

19. The computer program product of claim 15, wherein informal learning is learning in which the learner decided when and how sources are used.

* * * * *